(12) United States Patent
Chaubard et al.

(10) Patent No.: US 10,600,043 B2
(45) Date of Patent: Mar. 24, 2020

(54) AUTOMATED CHECKOUT SYSTEM THROUGH MOBILE SHOPPING UNITS

(71) Applicant: Focal Systems, Inc., Millbrae, CA (US)

(72) Inventors: Francois Chaubard, Millbrae, CA (US); Adriano Quiroga Garafulic, Sao Paulo (BR)

(73) Assignee: Focal Systems, Inc., Burlingame, CA (US)

( * ) Notice: Subject to any disclaimer, the term of this patent is extended or adjusted under 35 U.S.C. 154(b) by 254 days.

(21) Appl. No.: 15/885,746

(22) Filed: Jan. 31, 2018

(65) Prior Publication Data

US 2018/0218351 A1    Aug. 2, 2018

Related U.S. Application Data

(60) Provisional application No. 62/452,895, filed on Jan. 31, 2017.

(51) Int. Cl.
*G06Q 20/20* (2012.01)
*G06Q 30/06* (2012.01)
(Continued)

(52) U.S. Cl.
CPC ....... *G06Q 20/208* (2013.01); *G01G 19/4144* (2013.01); *G06N 3/0454* (2013.01);
(Continued)

(58) Field of Classification Search
CPC . G06Q 20/208; G01G 19/4144; G07G 1/0072
See application file for complete search history.

(56) References Cited

U.S. PATENT DOCUMENTS

| | | |
|---|---|---|
| 5,821,512 A | 10/1998 | O'Hagan et al. |
| 6,434,530 B1 | 8/2002 | Sloane et al. |

(Continued)

FOREIGN PATENT DOCUMENTS

| | | |
|---|---|---|
| CN | 202806824 U | 3/2013 |
| CN | 202896621 U | 4/2013 |

(Continued)

OTHER PUBLICATIONS

PCT International Search Report and Written Opinion, PCT Application No. PCT/US2017/030429, dated Jul. 19, 2017, 15 pages.
(Continued)

*Primary Examiner* — A. Hunter Wilder
(74) *Attorney, Agent, or Firm* — Fenwick & West LLP

(57) ABSTRACT

A mobile shopping unit of an automated checkout system includes one or more sensors within a shopping cart that detect when a change to the contents of the shopping cart has occurred. If the mobile shopping unit detects a change, the mobile shopping unit captures image data of the contents of the shopping cart using one or more cameras mounted to the shopping cart. The mobile shopping unit uses the image data to identify the item added to or removed from the cart. The mobile shopping unit applies a machine-learned item identification model to the image data received from the cameras to determine an item identifier for the added or removed item. When the mobile shopping unit determines the identifier for the added or removed item, the mobile shopping unit updates a contents list associated with the customer that stores the items currently collected by the customer.

18 Claims, 4 Drawing Sheets

(51) Int. Cl.
*G07G 1/00* (2006.01)
*G01G 19/414* (2006.01)
*H04N 5/225* (2006.01)
*H04N 7/18* (2006.01)
*G06N 3/04* (2006.01)
*G06N 3/08* (2006.01)
*B62B 5/00* (2006.01)
*B62B 3/14* (2006.01)

(52) U.S. Cl.
CPC ....... *G06Q 30/0633* (2013.01); *G07G 1/0072* (2013.01); *G07G 1/0081* (2013.01); *H04N 5/2253* (2013.01); *H04N 7/181* (2013.01); *B62B 3/14* (2013.01); *B62B 5/0096* (2013.01); *B62B 2203/50* (2013.01); *G06N 3/0445* (2013.01); *G06N 3/08* (2013.01)

(56) References Cited

U.S. PATENT DOCUMENTS

| | | | |
|---|---|---|---|
| 9,443,314 | B1 | 9/2016 | Huang et al. |
| 2006/0208072 | A1 | 9/2006 | Ku et al. |
| 2006/0219780 | A1 | 10/2006 | Swartz et al. |
| 2007/0284440 | A1 | 12/2007 | Birmingham et al. |
| 2008/0230603 | A1* | 9/2008 | Stawar .................. B62B 3/1408 235/383 |
| 2010/0096450 | A1 | 4/2010 | Silverbrook et al. |
| 2012/0284132 | A1* | 11/2012 | Kim ..................... G07G 1/0081 705/20 |
| 2014/0079321 | A1 | 3/2014 | Huynh-Thu et al. |
| 2014/0164176 | A1 | 6/2014 | Kitlyar |
| 2014/0176727 | A1 | 6/2014 | Saptharishi et al. |
| 2014/0207590 | A1 | 7/2014 | Bouaziz et al. |
| 2015/0025969 | A1 | 1/2015 | Schroll et al. |
| 2015/0039458 | A1 | 2/2015 | Reid |
| 2019/0057435 | A1* | 2/2019 | Chomley ................. B62B 3/14 |

FOREIGN PATENT DOCUMENTS

| | | |
|---|---|---|
| CN | 203142736 U | 8/2013 |
| EP | 2381409 A2 | 10/2011 |
| WO | WO 2005/096237 A1 | 10/2005 |
| WO | WO 2016/135142 A1 | 9/2016 |
| WO | WO 2018/002864 A2 | 1/2018 |

OTHER PUBLICATIONS

PCT International Search Report and Written Opinion, PCT Application No. PCT/US18/16317, dated Apr. 19, 2018, 17 pages.
PCT International Search Report and Written Opinion, PCT Application No. PCT/US18/32610, dated Aug. 24, 2018, 17 pages.

* cited by examiner

AUTOMATED CHECKOUT SYSTEM THROUGH MOBILE SHOPPING UNITS

CROSS REFERENCE TO RELATED APPLICATION

The present disclosure claims the benefit of U.S. Provisional Patent Application No. 62/452,895, entitled "Automatic Checkout via Computer Vision on a Shopping cart or Hand-Basket" and filed on Jan. 31, 2017, which is hereby incorporated by reference.

BACKGROUND

In conventional stores, a customer collects items in a shopping cart or a hand-held basket, and brings the collected items to a cashier. Typically, the cashier must scan a barcode that is printed or placed on each item that the customer is purchasing, and a point-of-sale (POS) system determines the total price of the collected items. However, this method for checking out a customer in a store is inefficient. A cashier must scan each item purchased by every customer who shops at the store. If too many customers want to check out of the store at the same time, a customer may have to wait in line for a long time before a cashier can check out the customer from the store. Some stores parallelize this process by making more than one cashier and POS system available to customers. However, stores must pay cashiers to be available to check out customers, and thus additional cashiers may be prohibitively expensive for stores.

Some stores include automated point-of-sale systems wherein a customer uses the point-of-sale system directly to purchase their items and check out of the store without a cashier. However, these automated POS systems can still be prone to long lines, and the unfamiliar user interfaces can be difficult for a customer to use.

SUMMARY

An automated checkout system maintains a contents list for a customer that describes items collected by the customer in a shopping cart. The automated checkout system includes a mobile shopping unit that includes one or more sensors within a shopping cart that detect when a change to the contents of the shopping cart has occurred. For example, the mobile shopping unit may include a load sensor that determines the weight of the contents of the shopping cart and, if the weight of the shopping cart's contents changes, the mobile shopping unit detects a change to the contents of the shopping cart.

If the mobile shopping unit detects a change, the mobile shopping unit captures image data of the contents of the shopping cart using one or more cameras mounted to the shopping cart. The one or more cameras can be directed towards a storage area of the shopping cart to capture image data of the contents of the shopping cart. The mobile shopping unit uses the image data to determine an item identifier for an item added to the cart or removed from the cart. In some embodiments, the mobile shopping unit applies a machine-learned item identification model to the image data received from the cameras to determine the item identifier for the added or removed item.

When the mobile shopping unit determines the identifier for the added or removed item, the mobile shopping unit updates a contents list associated with the customer that stores the items currently collected by the customer. The contents list can include list elements that each correspond to a different item identifier. Each list element stores a count of items of the corresponding item identifier that are stored in the shopping cart. If the mobile shopping unit identifies an item that has been added to the shopping cart, the mobile shopping unit updates the contents list by adding a list element corresponding to the item's identifier if the list element does not already exist, or incrementing the count associated with the corresponding list element. Thus, the mobile shopping unit maintains the contents list for the customer by identifying items as the items are added to or removed from the shopping cart.

The automated checkout system improves a customer's experience at a store by reducing the customer's wait time to check out from the store. Similarly, the store can service customers more quickly without hiring more cashiers, thereby providing increased customer turnover at the store without increased costs. Furthermore, the customer is not required to learn complicated new user interfaces to automatically check out from the store. Items are automatically added to the contents list without direct user interaction with the automated checkout system, meaning that customers can more easily use such an automated checkout system.

BRIEF DESCRIPTION OF THE DRAWINGS

Figure (FIG. 1 illustrates a system environment and architecture for an automated checkout system, in accordance with some embodiments.

DETAILED DESCRIPTION

Figure 1:
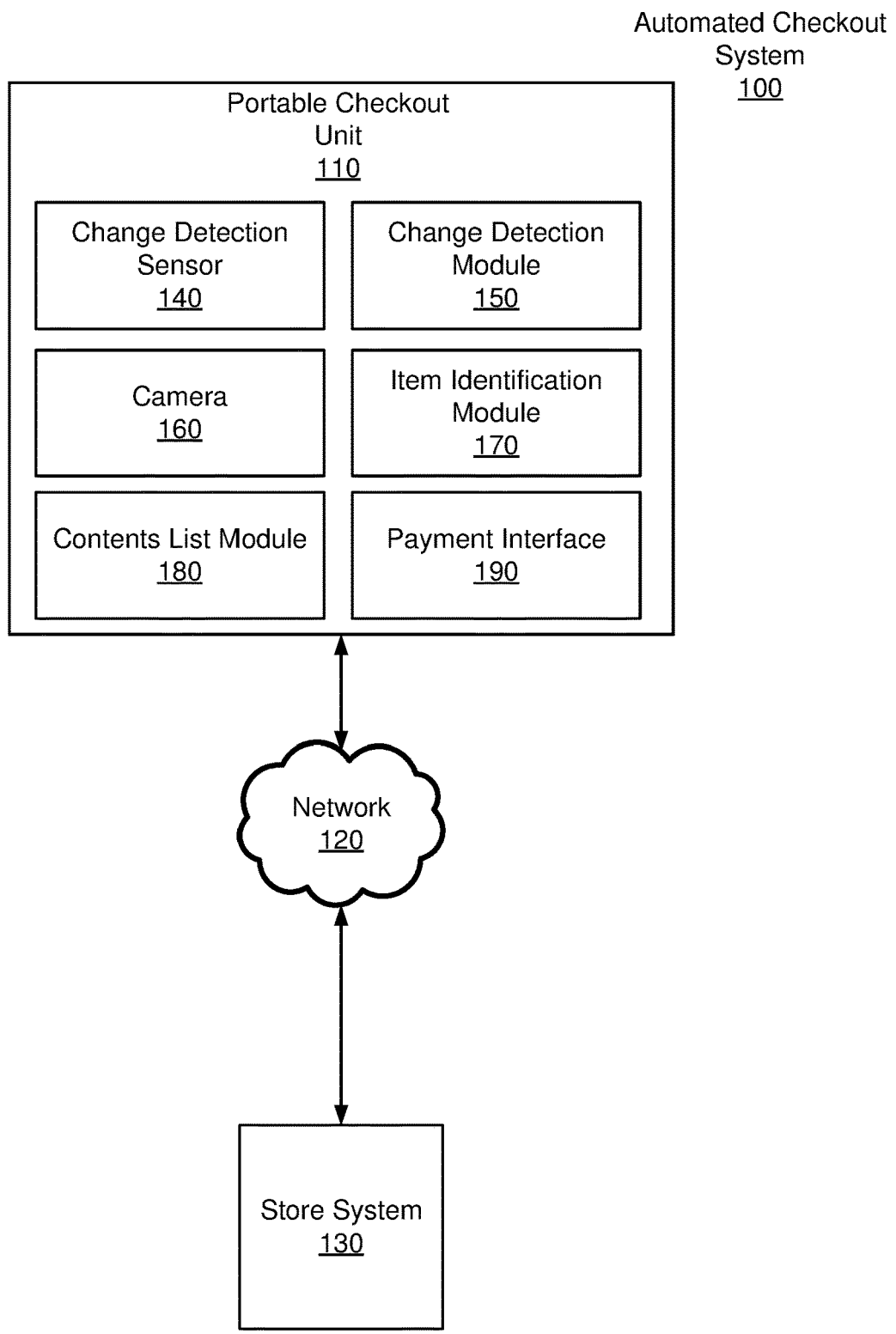

An automated checkout system automatically updates a contents list for a customer by detecting when the customer adds an item to their shopping cart and identifying the item and quantity of items that the customer added to the shopping cart. Figure (FIG. 1 illustrates an example system environment for an automated checkout system 100, in accordance with some embodiments. The system environment illustrated in FIG. 1 includes a mobile shopping unit 110, a network 120, and a store system 130. Alternate embodiments may include more, fewer, or different components from those illustrated in FIG. 1, and the functionality of each component may be divided between the components differently from the description below. Additionally, each component may perform their respective functionalities in response to a request from a human, or automatically without human intervention.

The mobile shopping unit 110 generates a contents list for the customer while the customer collects items within a store. The mobile shopping unit 110 is physically attached to a shopping cart or a hand-held basket, referred to generically herein as a "shopping cart," that is made available by a store that is using the expedited checkout system 100. In some embodiments, the mobile shopping unit 110 can be attached to a pre-existing shopping cart or hand-held basket, e.g. via a bracket, a mount, a strap, screws, bolts, or adhesive. In other embodiments, the mobile shopping unit 110 can be manufactured into the shopping cart itself.

FIG. 1 illustrates an example system architecture of a mobile shopping unit 110, in accordance with some embodiments. The mobile shopping unit 110 illustrated in FIG. 1 includes one or more change detection sensors 140, a change detection module 150, one or more cameras 160, an item identification module 170, a shopping list module 180, and a payment interface 190. The functionality of each component may be divided between the components differently from the description below and alternative embodiments may include more, fewer, or different components than those illustrated in FIG. 1. For example, the mobile shopping unit 110 may include a central processing unit, a data store, a display, an audio interface, or a network interface. Additionally, each component may perform their respective functionalities in response to a request from a human, or automatically without human intervention. Furthermore, the functionality of some components of the mobile shopping unit 110 may be performed by the store system 130. For example, the functionality of the change detection module 150 or the item identification module 170 may be performed by the store system 130, and the store system 130 may communicate with the mobile shopping unit 110 via the network 120 to execute the functionality of these modules.

One or more change detection sensors 140 captures sensor data about items within the shopping cart, or about the area within and outside of the shopping cart, to determine whether a change has been made to the contents of the shopping cart. For example, the change detection sensor 140 can include a load sensor, pressure sensor, tension sensor, force resistance sensor, load cell, depth sensor, heat sensor, vibration sensor, motion sensor, break beam sensor, a proximity sensor, or a camera. The change detection sensor 140 transmits sensor data to the change detection module 150, which detects changes to the contents of the shopping cart. For example, if the change detection sensor 140 is a load sensor or an electronic scale that measures the weight of the contents in the shopping cart, the change detection module 150 may detect a change in the weight of the contents and thereby detect whether the user has added or removed items from the shopping cart. Similarly, if the change detection sensor 140 is a proximity sensor that collects data describing when an object approaches or moves away from the storage area of the shopping cart, the change detection module 150 can detect when an item enters or leaves the shopping cart based on the sensor data and thereby detect a change in the contents of the shopping cart.

The change detection module 150 can use a threshold for the sensor data to determine whether the customer has made a change to the shopping cart's contents. For example, the change detection module 150 may use a threshold change in the weight of the contents or a threshold proximity distance of an item to the shopping cart to determine whether a change to the contents of the shopping cart has occurred. In some embodiments, the change detection module 150 uses sensor data to determine whether the detected change was an item added to the shopping cart of the detected change was an item removed from the shopping cart. The change detection module 150 may determine whether the change was an addition or a removal based on a change of the weight of the contents of the shopping carts or based on whether an object approaches or moves away from the shopping cart.

In some embodiments, the change detection module 150 uses a camera 160 to detect a change to the contents of the shopping cart. The change detection module 150 can use image data from the camera 160 to determine whether an object is passing through a separating plane that defines the opening to the storage area of the shopping cart (e.g., the top of the shopping cart or the hand-held basket). If the change detection module 150 determines that an object is passing through this plane, the change detection module 150 may determine that a change is being made to the contents of the shopping cart. In some embodiments, the change detection module 150 identifies a set of pixels within the image data that represent the separating plane and determines whether a bounding box containing the object intersects with the set of pixels. If the bounding box intersects the set of pixels, the change detection module 150 may determine that a change is being made to the contents of the shopping cart. The change detection module 150 can also determine whether an item is being added to or removed from the shopping cart based on the direction that the bounding box travels within subsequent images captured by the camera 160. For example, the change detection module 150 may determine that an item is being added to the shopping cart if the predicted bounding box for the item moves towards the set of pixels representing the separating plane. In some embodiments, the change detection module 150 uses computer vision algorithms such as optical flow algorithm or an object detection deep learning neural network model like Faster RCNN (Region-based Convolutional Neural Network) to detect and classify an item within the image data and to predict a bounding box for the item within the image data with a corresponding identifier and a confidence score. In embodiments where the change detection module 150 uses an optical flow algorithm, the change detection module 150 can determine if the item is being added or removed from the shopping cart if the mean flow for the bounding box is going up or down, respectively.

In some cases, a shopper can add and remove a product simultaneously or nearly simultaneously. In these situations, the change detection module 150 consider each detected product bounding box that is crossing the separation plane independently and identify whether each item is being added or removed. In these cases, the change detection module 150 may take sequential images captured by the mobile shopping unit 110 to identify whether each item is being added or removed. In some embodiments, the change detection module 150 uses Intersection over Union on the sequential images from the mobile shopping device 110 to determine which items were added and which were removed.

One or more cameras 160 capture image data of the contents of the shopping cart. The image data may be still images or video data, and may additionally include a depth component to each pixel of the image data. The camera 160 is mounted to the shopping cart and is directed towards the storage area of the shopping cart that hold the contents of the shopping cart. More than one camera 160 may be mounted on the shopping cart to capture image data of the contents of the shopping cart from multiple directions. The camera 160 may be configured to continually capture image data of the contents of the shopping cart or may be configured to capture image data in response to the change detection module 150 detecting a change in the contents of the shopping cart. In the latter embodiments, the camera 160 may delay capturing image data based on a time delay to ensure that the contents of the shopping cart settle after the addition or removal of an item from the shopping cart.

The item identification module 170 identifies an item identifier for an item added to or removed from the shopping cart as part of a detected change to the contents of the shopping cart. The item identifier identifies a type of the item that is added to or removed from the shopping cart based on image data received from the camera 160. An item type describes a particular product, brand, or category. In some embodiments, the item identifier is a stock keeping unit or a universal product code.

The item identification module uses an item identification algorithm to identify items within the shopping cart. The item identification algorithm may include an optical character recognition (OCR) algorithm to recognize text on the items within the shopping cart to identify the items in the shopping cart. Similarly, the item identification algorithm may identify a barcode on an added item to identify the item. The item identification module 170 can additionally use a machine-learned item identification model to identify items within the shopping cart. For example, the item identification module 170 may use a convolutional neural network, recurrent neural network, or some other type of neural network to identify items within the shopping cart. The machine-learned item identification model can be trained on labeled images of items that may be added to or removed from the shopping cart.

In some embodiments, the item identification module 170 uses a bounding box detection model to identify items associated with a change in the contents of the shopping cart. The bounding box detection model can use a two stage architecture similar to Faster Region-based Convolutional Neural Network (Faster RCNN) or the one stage architecture of You Only Look Once (YOLO). The bounding box detection model can receive an image from the mobile checkout unit 110 and detects a one or more bounding boxes. Each bounding box may be associated with a set of confidence scores, each confidence score corresponding to an item identifier and representing a likelihood that the item identifier identifies the type of the item associated with the bounding box.

The item identification module 170 can use the confidence scores for a bounding box to identify the item contained by the bounding box. For example, the item identification module 170 may identify the item based on the highest confidence score of the set of confidence scores for the bounding box. In some embodiments, the item identification module 170 crops portions of the image corresponding to bounding boxes with confidence scores higher than a threshold value and applies a more-powerful, if less-efficient, model to the cropped portions of the image. The more-powerful model may include a homography matching algorithm to a database, or another convolutional neural network that operates on a higher resolution version of the cropped portions of the image. The more-powerful model may also include Optical Character Recognition to read any text that is on the product, and use sensor data from the change detection sensor 140 to identify the item (e.g., changes in weight of the shopping cart or the total weight of the shopping cart).

In some embodiments, the item identification model is trained by initially having a customer scan each item before adding the item to the shopping cart. The item identification model is thereby provided with substantial amounts of labeled training data automatically by customers as they shop in the store. U.S. patent application Ser. No. 15/578,713 entitled "Expedited Checkout System Through Mobile shopping units" describes a system whereby customers scan items to be added to a contents list, then when dropped into the cart, the system will take images, and which then, may be used directly as labeled training data, the contents of which are hereby incorporated by reference in their entirety.

The item identification algorithm can generate bounding boxes for identified items within the shopping cart. Each bounding box may be associated with a confidence score representing the likelihood that the item identification algorithm's prediction for the item's identifier is accurate. In some embodiments, the item identification algorithm identifies each item in the shopping cart and determines the item identifier of the added or removed item by comparing the current set of identified items with the set of identified items in the shopping cart when the last change was made to the shopping cart's contents. For example, if an item is added to the shopping cart, the item identification algorithm may identify the set of items that are currently in the shopping cart and can identify the added item by determining which item was not in the shopping cart when the item identification module 170 previously identified the items in the shopping cart. Similarly, if an item is removed from the shopping cart, the item identification algorithm can identify the removed item by identifying which previously identified item is no longer identified by the item identification module 170.

In some embodiments, the item identification module 170 can identify when the camera 160 becomes occluded. The item identification module 170 can identify the camera as occluded based on images from the camera 160 or based on sensor data from the change detection sensor 140. If the item identification module 170 detects that the camera 160 is occluded, the item identification module 170 can transmit a notification to the mobile client device 110 or the store system 130.

In some cases, a product may be covered by other products and may not be visible by the camera 160 even though it is still in the shopping cart. The item identification module 170 may use the sensor data from the change detection sensor 140 to identify item associated with the change. For example, the item identification module 170 may use weight data from a load sensor to identify the item. In some embodiments, the item identification module 170 prompts the shopper to identify the item associated with the change. For example, the item identification module 170 may require that the shopper scan the item using a barcode scanner or may require that the shopper identify the item via a user interface. The item identification module 170 may additionally transmit a notification to the store system 130 to have a store associate identify the item associated with the change.

In some embodiments, the item identification module 170 uses more than one item identification model to identify items within the shopping cart. For example, the item identification module 170 may use a superclass identification model that identifies a superclass of the item that broadly describes the item. For example, the superclass may identify the container of the item (e.g., box, can, shopping carton, or bag) or a category of the item (e.g., food, clothing, or electronics). Another item identification model may use the identified superclass for the item to more efficiently identify the item. This can allow for more efficient identification of items, particularly if the second item identification model is more resource-intensive than the first item identification model.

In some embodiments, the item identification algorithm may use the customer's location within the store to filter the possible items that may be added to the shopping cart. The mobile shopping unit 110 can determine the customer's location within the store based on GPS data, RFID data from RFID sensors located within the store, or using an image-based method as described in U.S. patent application Ser. No. 15/656,922 entitled "Determining In-Store Location Based on Images," the contents of which are hereby incorporated by reference in their entirety. The item identification algorithm can then compare the customer's location within the store to a planogram of the store to determine which items are near the customer and may reduce the possible items that may have been added to the shopping cart to items that are located within a threshold distance of the customer's location.

The item identification module 170 can further determine a count of items associated with a change to the contents of the shopping cart. The item identification module 170 may identify more than one item that have been added to or removed from the shopping cart. For example, the item identification module 170 may identify that more than one item associated with one item identifier were added to the shopping cart and may provide a count of the newly added items to the shopping list module for storage in a contents list. In some embodiments, the item identification module 170 uses sensor data from the change detection sensor 140 to determine the count of items that have been added to or removed from the shopping cart. For example, if the change detection sensor 140 includes a load sensor, the item identification module 170 may use the change in the weight of the contents of the shopping cart to determine the count of items that have been added to or removed from the shopping cart.

The shopping list module 180 maintains and updates a contents list for the customer during the customer's visit to the store. The contents list is a list of one or more list elements that describe items that the customer has collected in the shopping cart to purchase from the store. Each list element includes an item identifier and a count of items collected by the customer that are associated with the item identifier. When the item identification module 170 identifies an item that has been added or removed from the shopping cart, the item identification module 170 transmits the item identifier for the identified item to the shopping list module 180. The item identification module 170 may also transmit a count of the number of items added or removed from the shopping cart. The shopping list module 180 updates the contents list based on the received item identifier. If a list element associated with a received item identifier for an added item does not yet exist, the shopping list module 180 generates a new list element and stores the new list element in the contents list. If a list element already exists for an item identifier for an item added or removed from the shopping cart, the shopping list module 180 updates the count associated with the list element according to whether the item was added or removed from the shopping cart.

Each list element may also store information about the items associated with the list elements, such as the names of the items, descriptions of the items, a picture of the item, pricing information of each item, or nutrition information of each item. The shopping list module 180 may receive the item information from an item database stored by the store system 130 via the network 120. To receive the item information from the store system 130, the shopping list module 180 may transmit the item identifier to the store system 130 and, in response to receiving the item identifier, the store system 130 may transmit item information associated with the item identifier to the shopping list module 180. In some embodiments, some or all of the item database is stored by the mobile shopping unit 110.

The shopping list module 180 may also present advertisements or coupons to the customer that are related to the items in the customer's contents list. For example, if the customer has bread in their contents list, the shopping list module 180 may present advertisements or coupons for sliced meats or for condiments. The shopping list module 180 displays advertisements or coupons to the user via a display of the mobile shopping unit 110.

When the customer is ready to checkout from the store, the customer can select a checkout option presented by the payment interface 190 and, in response, the mobile shopping unit 110 initiates the transaction for the customer to check out of the store. In some embodiments, the customer checks out of the store without going to a POS system. For example, the customer may use the payment interface 190 provided by the mobile shopping unit 110 to pay for the items in their contents list. The payment interface 190 transmits payment information received from the customer to the store system 130 to execute the checkout transaction. If the payment information is valid and the transaction is successful, the mobile shopping unit 110 is notified by the store system 130 that the transaction was successful, and presents a notification to the customer with a receipt for the checkout transaction. The mobile shopping unit 110 may print the receipt for the customer via a thermal printer, or may provide an option to the customer to be sent an electronic receipt for the transaction (e.g., via email or text message). In some embodiments, an employee of the store confirms that the customer has only the items that the customer has purchased. The customer may be required to present a receipt to the employee (cashier or auditor) for the checkout transaction, such as printed receipt or an electronic receipt transmitted to the customer or to the employee via a store-owned electronic display.

In some embodiments, the customer checks out via a POS system. The customer may be required to provide a customer identifier or a shopping list identifier to a cashier operating the POS system. For example, the customer may be required to provide their name, their initials, a customer identification number, an email address, a username, or a shopping list identification number. In some embodiments, the mobile shopping unit 110 presents a shopping list identifier to be used to identify the customer's contents list to the POS system. For example, the mobile shopping unit 110 may present a PIN, a WiFi, Bluetooth or NFC connection with identifier, RFID tag, a one-dimensional barcode, or a two-dimensional barcode that can be used to identify the customer's contents list. When the POS system receives the shopping list identifier, the POS system retrieves the contents list from the store system 130 or the mobile shopping unit 110. The employee operating the POS system may check the items collected by the customer and ensure that the items are accounted for in the contents list. The customer uses the POS system to provide payment information for the transaction and can receive a receipt for the transaction from the POS system physically or electronically.

The mobile shopping unit 110 can communicate with the store system 130 via the network 120, which may comprise any combination of local area and wide area networks employing wired or wireless communication links. In some embodiments, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). All or some of the communication links of the network 120 may be encrypted. In some embodiments, the network 120 comprises a network operated by the store that uses the automated checkout system 100.

The store system 130 comprises one or more computing devices that are operated by a store that uses the automated checkout system 100. The store system 130 stores a database of item information for items sold by the store. For example, the store system 130 may store item identifiers, item names, item descriptions, item reviews, item pictures, advertisements associated with items, and coupons associated with items. In some embodiments, the store system 130 also stores a copy of contents lists for customers shopping within the store. The store system 130 may receive the contents lists from mobile shopping units 110 when the contents lists are updated or when the customer is about to check out of the store. In some embodiments, the store system 130 receives payment information from a mobile shopping unit 110 or a POS system at which the customer is checking out to charge the customer for the items in their contents list.

Example Mobile Shopping Unit Configurations

Figure 2:
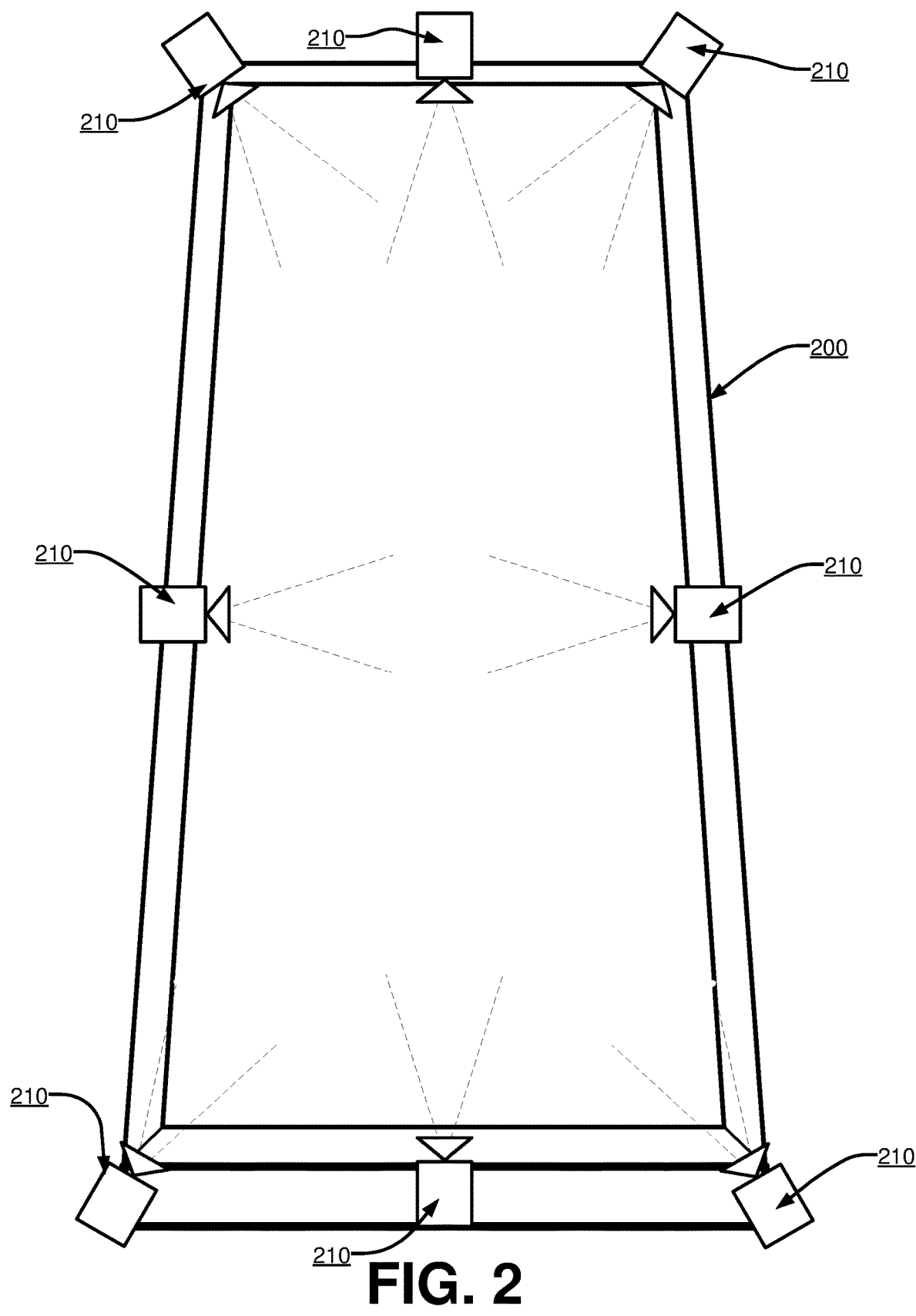
FIG. 2 is a top-down view illustration of example camera positions for a mobile shopping unit on a shopping cart 200, in accordance with some embodiments.

FIG. 2 is a top-down view illustration of example camera positions for a mobile shopping unit on a shopping cart 200, in accordance with some embodiments. As explained above, the mobile shopping unit can be mounted to a shopping cart, as pictured in FIG. 2, or to a hand-held basket. Cameras 210 are mounted at various positions on the shopping cart 200, which provides a variety of angles at which image data can be collected to identify items that have been added to or removed from the shopping cart 200. Any or all of these example camera positions may be used and the set of camera positions illustrated in FIG. 2 are not an exhaustive set of possible camera positions that may be used by mobile shopping units.

Figure 3:
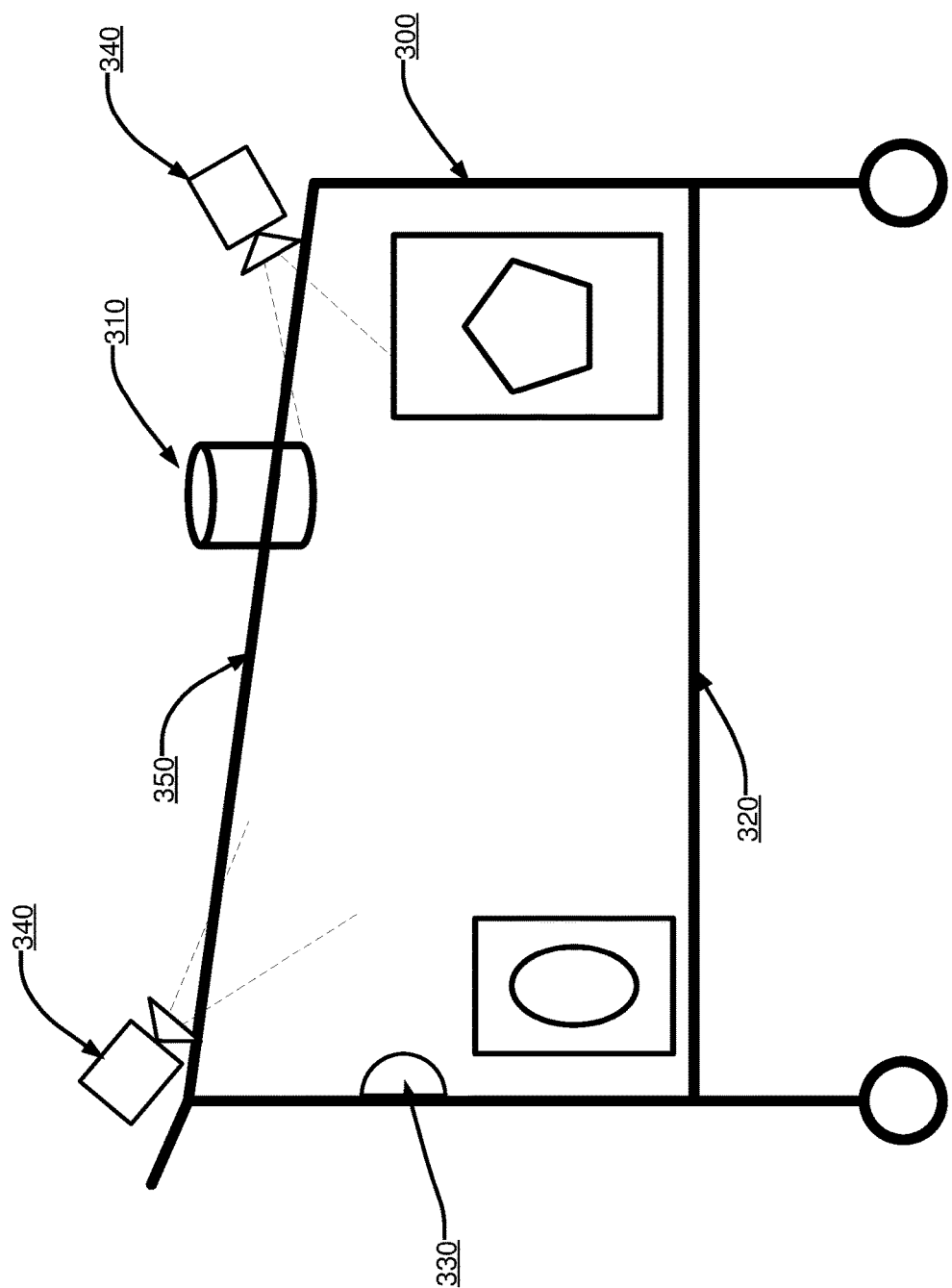
FIG. 3 is a side view illustration of a shopping cart 300 with a mobile shopping unit, in accordance with some embodiments.

FIG. 3 is a side view illustration of a shopping cart 300 with a mobile shopping unit, in accordance with some embodiments. In the embodiment illustrated in FIG. 3, an item 310 is being added to the shopping cart 300. The mobile shopping unit can detect the added item 310 using change detection sensors mounted to the shopping cart 300. For example, a load sensor 320 positioned at the bottom of the storage area of the shopping cart 300 may detect a change in the weight of the contents of the shopping cart, or a proximity sensor 330 may detect that the added item 310 has approached the storage area of the shopping cart 300. In some embodiments, one or more cameras 340 affixed to the shopping cart 300 determine whether the added item 310 has crossed a plane 350 representing the opening of the storage area of the shopping cart 300. When the mobile shopping unit detects a change to the contents of the shopping cart 300, the mobile shopping unit uses image data from the cameras 340 to identify the item or items associated with the change to the contents. For example, the cameras 340 may identify that the added item 310 is a can of soup. The mobile shopping unit uses an item identifier for the added item 310 to update a contents list for the user.

Example Method for Automated Store Checkout

Figure 4:
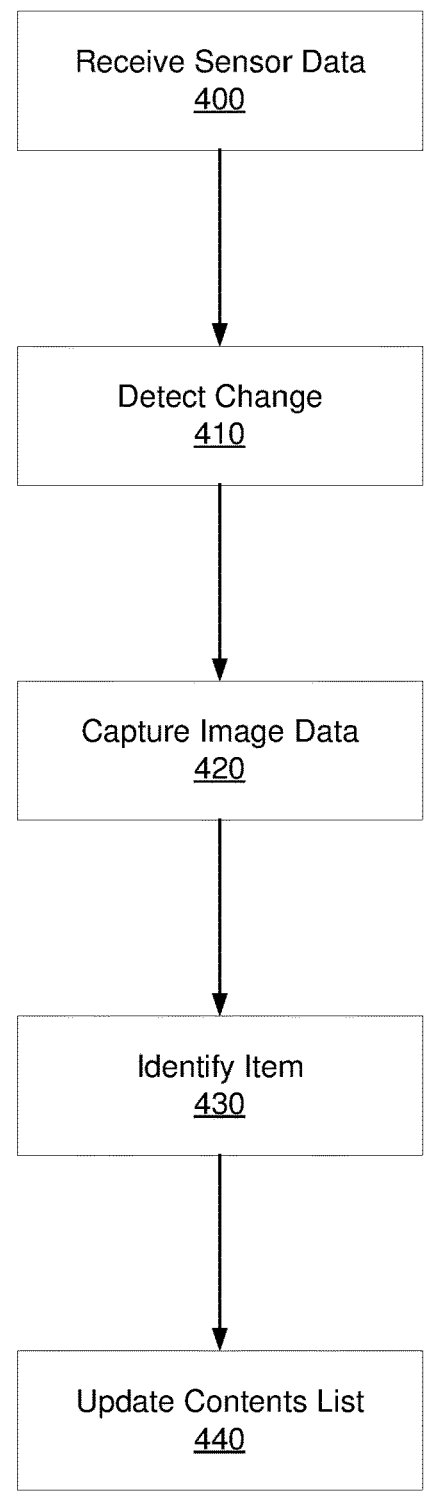
FIG. 4 is a flowchart for a method for automated store checkout, in accordance with some embodiments.

FIG. 4 is a flowchart for a method for automated store checkout, in accordance with some embodiments. Alternate embodiments may include more, fewer, or different steps from those illustrated in FIG. 4, and the steps may be performed in a different order from that illustrated in FIG. 4. Additionally, each of these steps may be performed automatically by the mobile shopping unit or the store system without human intervention.

The mobile shopping unit receives 400 sensor data from one or more change detection sensors mounted to a shopping cart in use by a customer. The sensor data can include data from a proximity sensor, a load sensor, an electronic scale, or a camera. The mobile shopping unit detects 410 a change to the contents of the shopping cart based on the sensor data. For example, the mobile shopping unit may detect a change in the weight of the contents of the shopping cart based on sensor data from a load sensor, or may detect an item approaching the storage area of the shopping cart based on sensor data from a proximity sensor. In some embodiments, the mobile shopping unit detects a change when image data from a camera indicates that an item is crossing a separation plane that represents the opening of the storage area of the shopping cart.

If the mobile shopping unit detects 410 a change to the contents of the shopping cart, the mobile shopping unit captures 420 image data from one or more cameras mounted to the shopping cart. The cameras may be directed towards the contents of the shopping cart such that the cameras capture image data of the current contents of the shopping cart. The mobile shopping unit identifies 430 an item added to the shopping cart or removed from the shopping cart as a part of the detected change. To identify the added or removed item, the mobile shopping unit can identify items that are currently in the shopping cart and compare the set of identified items to a set of items that were identified when the mobile shopping unit previously identified the items that were stored by the shopping cart. The mobile shopping unit may identify items in the shopping cart using a machine-learned item identification model that has been trained to identify items in the shopping cart.

The mobile shopping unit updates 440 a contents list based on the identified item and the detected change. The mobile shopping unit can determine an item identifier for the identified item and can add or update a list element in the contents list corresponding to the item identifier. The mobile shopping unit also may determine a count of items associated with the change and update the contents list based on the determined count of items.

Additional Considerations

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving sensor data from one or more change detection sensors of a mobile shopping unit mounted to a shopping cart associated with a customer of a store;
   detecting a change to contents of the shopping cart based on the sensor data, the change being associated with one or more items and the change comprising the one or more items being added to the shopping cart by the customer or being removed from the shopping cart by the customer, wherein detecting the change to the contents of the shopping cart comprises:
   receiving image data from one or more cameras of the mobile shopping unit;
   generating one or more bounding boxes that contain the one or more items moving towards or away from the shopping cart; and
   determining if the one or more bounding boxes intersect with pixels representing a separation plane of an opening of the shopping cart;
   responsive to detecting the change, determining one or more confidence scores for each of the one or more bounding boxes, wherein each of the one or more confidence scores corresponds to an item identifier and represents a likelihood that the item identifier identifies a respective item of the one or more items associated with a respective bounding box of the one or more bounding boxes;
   responsive to a confidence score of the one or more confidence scores being lower than a threshold value,
   cropping a bounding box associated with the confidence score from the image data; and
   applying a further analysis to the cropped bounding box; and
   responsive to a confidence score of the one or more confidence scores exceeding the threshold value,
   determining one or more item identifiers for the one or more items associated with the change based on the one or more confidence scores or the further analysis; and
   updating a contents list associated with the customer based on the determined one or more item identifiers and the detected change.

2. The method of claim 1, wherein detecting the change to the contents of the shopping cart further comprises:
   receiving weight data from a load sensor within the shopping cart; and
   detecting a change in a weight of the contents of the shopping cart based on the weight data.

3. The method of claim 1, wherein detecting the change to the contents of the shopping cart further comprises:
   receiving proximity data from a proximity sensor within the shopping cart; and
   detecting an item moving towards or moving away from an opening to the shopping cart based on the proximity data.

4. The method of claim 1, wherein the further analysis comprises:
   applying a machine-learned item identification model to the cropped bounding box.

5. The method of claim 4, wherein the machine-learned item identification model comprises a neural network.

6. The method of claim 1, wherein determining the one or more item identifiers for the one or more items further comprises:
   determining item identifiers for a first set of items within the shopping cart prior to detecting the change to the contents of the shopping cart;
   responsive to detecting the change, determining item identifiers a second set of items within the shopping cart; and
   comparing the item identifiers for the first set of items and the item identifiers for the second set of items.

7. The method of claim 1, further comprising:
   determining whether the one or more items are added to the shopping cart or whether the one or more items are removed from the shopping cart.

8. The method of claim 7, further comprising:
   responsive to determining that the one or more items are added to the shopping cart, adding or incrementing a list element within the contents list that is associated with the one or more item identifiers.

9. The method of claim 7, further comprising:
   responsive to determining that the one or more items are removed from the shopping cart, deleting or decrementing a list element within the contents list that is associated with the one or more item identifiers.

10. A non-transitory, computer-readable medium comprising instructions that, when executed by a processor, cause the processor to:
receive sensor data from one or more change detection sensors of a mobile shopping unit mounted to a shopping cart associated with a customer of a store;
detect a change to contents of the shopping cart based on the sensor data, the change being associated with one or more items and the change comprising the one or more items being added to the shopping cart by the customer or being removed from the shopping cart by the customer, wherein detecting the change to the contents of the shopping cart comprises:
receiving image data from one or more cameras of the mobile shopping unit;
generating one or more bounding boxes that contain the one or more items moving towards or away from the shopping cart; and
determining if the one or more bounding boxes intersect with pixels representing a separation plane of an opening of the shopping cart;
responsive to detecting the change, determine one or more confidence scores for each of the one or more bounding boxes, wherein each of the one or more confidence scores corresponds to an item identifier and represents a likelihood that the item identifier identifies a respective item of the one or more items associated with a respective bounding box of the one or more bounding boxes;
responsive to a confidence score of the one or more confidence scores being lower than a threshold value,
crop a bounding box associated with the confidence score from the image data; and
apply a further analysis to the cropped bounding box; and
responsive to a confidence score of the one or more confidence scores exceeding the threshold value,
determine one or more item identifiers for the one or more items associated with the change based on the one or more confidence scores or the further analysis; and
update a contents list associated with the customer based on the determined one or more item identifiers and the detected change.

11. The computer-readable medium of claim 10, wherein the instructions for detecting the change to the contents of the shopping cart further cause the processor to:
receive weight data from a load sensor within the shopping cart; and
detect a change in a weight of the contents of the shopping cart based on the weight data.

12. The computer-readable medium of claim 10, wherein the instructions for detecting the change to the contents of the shopping cart further cause the processor to:
receive proximity data from a proximity sensor within the shopping cart; and
detect an item moving towards or moving away from an opening to the shopping cart based on the proximity data.

13. The computer-readable medium of claim 10, wherein the further analysis further causes the processor to:
apply a machine-learned item identification model to the captured image data.

14. The computer-readable medium of claim 13, wherein the machine-learned item identification model comprises a neural network.

15. The computer-readable medium of claim 10, wherein the instructions for determining the one or more item identifiers for the one or more items further cause the processor to:
determine item identifiers for a first set of items within the shopping cart prior to detecting the change to the contents of the shopping cart;
responsive to detecting the change, determine item identifiers a second set of items within the shopping cart; and
compare the item identifiers for the first set of items and the item identifiers for the second set of items.

16. The computer-readable medium of claim 10, wherein the instructions further cause the processor to:
determine whether the one or more items are added to the shopping cart or whether the one or more items are removed from the shopping cart.

17. The computer-readable medium of claim 16, wherein the instructions further cause the processor to:
responsive to determining that the one or more items are added to the shopping cart, add or increment a list element within the contents list that is associated with the one or more item identifiers.

18. A mobile shopping unit mounted to a shopping cart associated with a customer, the mobile shopping unit comprising:
one or more change detection sensors mounted to the shopping cart;
one or more cameras mounted to the shopping cart and oriented to capture image data of items placed in a storage area of the shopping cart;
a processor; and
a non-transitory, computer-readable medium comprising instructions that, when executed by the processor, causes the processor to:
receive sensor data from the one or more change detection sensors;
detect a change to contents of the shopping cart based on the sensor data, the change being associated with one or more items and the change comprising the one or more items being added to the shopping cart by the customer or being removed from the shopping cart by the customer, wherein detecting the change to the contents of the shopping cart comprises:
receiving image data from the one or more cameras;
generating one or more bounding boxes that contain the one or more items moving towards or away from the shopping cart; and
determining if the one or more bounding boxes intersect with pixels representing a separation plane of an opening of the shopping cart;
responsive to detecting the change, determining one or more confidence scores for each of the one or more bounding boxes, wherein each of the one or more confidence scores corresponds to an item identifier and represents a likelihood that the item identifier identifies a respective item of the one or more items associated with a respective bounding box of the one or more bounding boxes,
responsive to a confidence score of the one or more confidence scores being lower than a threshold value,
cropping a bounding box associated with the confidence score from the image data; and
applying a further analysis to the cropped bounding box; and responsive to a confidence score of the one or more confidence scores exceeding the threshold value, determine one or more item identifiers for the one or more items associated with the change based on the one or more confidence scores or the further analysis; and update a contents list associated with the customer based on the determined one or more item identifiers and the detected change.

* * * * *